United States Patent [19]

Rieger

[11] Patent Number: 4,665,807
[45] Date of Patent: May 19, 1987

[54] APPARATUS FOR TREATING LIQUID FOODSTUFFS, IN PARTICULAR, RED GRAPE MASH

[76] Inventor: Herbert Rieger, Talstrasse 33, D-7121 Ingersheim, Fed. Rep. of Germany

[21] Appl. No.: 714,707

[22] Filed: Mar. 21, 1985

[30] Foreign Application Priority Data

Mar. 22, 1984 [DE] Fed. Rep. of Germany ....... 3410457

[51] Int. Cl.⁴ .............................................. C12G 1/02
[52] U.S. Cl. .................................. 99/277.1; 99/277.2
[58] Field of Search .............. 99/275, 276, 277, 277.1, 99/277.2, 278; 426/11, 15

[56] References Cited

U.S. PATENT DOCUMENTS 3,875,303 4/1975 Hieber ................................. 99/277.1
3,910,173 10/1975 Zepponi ............................. 99/277.1

FOREIGN PATENT DOCUMENTS 231930 11/1961 Austria .
258102 3/1913 Fed. Rep. of Germany .
628392 4/1936 Fed. Rep. of Germany .
2818013 4/1978 Fed. Rep. of Germany .
831877 4/1937 France .
2168214 1/1972 France .
2402470 9/1977 France .
2440991 10/1979 France .
2512056 8/1982 France .
149136 8/1919 United Kingdom .

OTHER PUBLICATIONS

Troost, "Technologie des Weines", 1972, pp. 160, 161 and 176-179.

Primary Examiner—Robert W. Jenkins
Attorney, Agent, or Firm—Kokjer, Kircher, Bradley, Wharton, Bowman & Johnson

[57] ABSTRACT

A method serves for treating liquid foodstuffs, in particular red grape mash. It comprises the steps of filling the mash (40) into the tank (10) from below until the upper level (43) of the mash is above a sieve (31) which is arranged in the upper portion of the tank (10), which fills the whole cross-sectional area thereof and which serves to retain pomace components (41) of the mash (40), and surrendering the mash (40) in this condition to fermentation for a pre-determined period of time. The sieve (31) used is rotatable about one horizontal axis (33) and the mash (40) is stirred at the end of a pre-determined period of time by rotation of the said sieve (31).

4 Claims, 3 Drawing Figures

APPARATUS FOR TREATING LIQUID FOODSTUFFS, IN PARTICULAR, RED GRAPE MASH

The present invention relates to a method for treating liquid foodstuffs, in particular red grape mash, comprising the steps of filling the mash into the tank from below until the upper level of the mash is above a sieve which is arranged in the upper portion of the tank, which fills the whole cross-sectional area thereof and which serves to retain pomace components of the mash, and surrendering the mash in this condition to fermentation for a pre-determined period of time.

The invention relates further to a device for treating liquid foodstuffs, in particular red grape mash, which is equipped at its bottom with a filling pipe for pumping in the mash and which comprises a sieve spanning the interior cross-sectional area of the tank perpendicularly to the vertical axis thereof and located in the upper portion of the tank a little below the level of the mash after the latter has been pumped in.

Although the invention will be described hereafter with reference to the treatment of red grape mash, it goes without saying that it can be used also for processing other liquid foodstuffs, such as extracts from vegetable and animal products.

There have been known from DE Patent Specification No. 628 392 a method and a device for the preparation of red wine in which a sieve similar in design to a coat of mail and bulging downwardly is arranged at approx. ¾ of the height of an upright tank. The red grape mash containing pomace components is introduced into the space below the sieve until the level of the grape juice is above the screen. During subsequent fermentation, the pomace components rise and cause the sieve to bulge upwardly. When in this condition mash is pumped off from below the screen, the bulging sense of the sieve is reversed causing the pomace cake to break and and solid components to drop to the bottom of the now empty tank.

Accordingly, the mash is not subjected in this known method to any further mechanical action so that the red color found predominantly in the skins of the grapes is washed out only to a limited degree.

Further, a device for fermenting red grape mash has been known from AT Patent Specification No. 231 930 where an upright fermentation tank tapering upwardly in the form of a truncated cone is used as a mash tank. Here again, a sieve is provided in the upper portion of the tank which fills the cross-sectional area thereof and which retains the rising pomace components below the liquid level. Further, an agitator rotating about a horizontal axis is provided below the sieve for agitating the mash by means of spoon-shaped agitator paddles.

This known device actually achieves in this manner improved color extraction, but handling of the device is relatively complicated, and the device obviously is intended and suited only for small quantities. For, lacking a possibility to fill the tank from a point below the sieve, it must be filled through the upper opening, of course with the sieve removed. Thereafter, the sieve must be seated on its mounting through the mash and secured in place in order to prevent it from being lifted off through the rising pomace. Finally, the proposed agitator is relatively complex in structure and difficult to clean so that on the whole the known device is unsuited for use in cellarage operations.

Further, there has been known from DE Patent Specification No. 258 102 a device for lifting and lowering the perforated bottom in grape mash vats. In this case, an upright mash tank is provided on board of a railway carriage and equipped with a sieve termed "perforated bottom" which, using a stem guide, can be adjusted to any height in which it is located just a little below the surface of the mash, depending on the quantity of mash filled in at any time.

In this known device, no means are provided for additional mechanical agitation of the mash.

The book "Technology of Wine" by G. Troost, Publishers: Eugen Ulmer Stuttgart, 1972, Vol. 1, page 176, describes also a tank for open fermentation comprising a "perforated bottom" which likewise can be filled through the top only so that the same handling difficulties are encountered during mounting of the sieve that have been described before. Further, this known devise also does not comprise any means for treating the mash mechanically.

A device for the fermentation of red grape mash has further been described in FR Patent Document No. 2 440 991. In this case, a sieve filling the cross-sectional area of a circular tank is provided in the top portion thereof, and the mash can be pumped into the tank below the sieve through a pipe arranged on the side of the tank. The tank is, however, hermetically sealed at the top, and the mash is pumped in only until the level is a little below the sieve. A pipeline provided with a pump connects a juice chamber arranged in the bottom portion of the tank with the dome area of the tank so that juice can be extracted at the bottom of the tank and pumped in again at a point above the sieve.

This means that in this arrangement the sieve does not influence the fermentation process directly, and there are also no mechanical means for treating the red grape mash.

Finally, FR Patent Document No. 2 168 214 describes a large-scale fermentation plant for red grape mash in which a total of seven tanks are joined in cascade. Three circular cylindrical tanks are provided with sieves arranged in their upper portions. The incoming mash is pumped into the tanks below the sieves until the liquid level is above the sieves. Now grape juice can be withdrawn from the area above the sieve and filled into the area below the sieve of the neighboring tank. Further, a possibility is provided to extract juice from below the sieve and to pump it into the area above the sieve via a pipe operating in the manner of a fountain.

Quite apart from its considerable complexity, this known system also does not provide any means ? or treating the mash mechanically.

Now, it is the object of the present invention to improve a method and a device of the type described before so that on the one hand a high quality of the wine in terms of a particularly beautiful color can be achieved, while on the other hand the red grape mash is treated with optimum care.

According to the method mentioned at the outset, this object is achieved in that the sieve used is rotatable about one horizontal axis and that the mash is mixed at the end of a pre-determined period of time by rotation of the said sieve.

According to the device mentioned at the outset, the object of the invention is achieved in that the sieve can be rotated about one horizontal axis.

Thus, the method and the device according to the invention offer the advantage that while maintaining the advantage known from certain ones of the printed publications mentioned above, namely that due to the fermentation process of the mash and the bubbles rising from the effervescing mash the color is washed out "automatically" from the pomace components which gather below the sieve so that the color is transferred into the grape juice present above the sieve, the color extraction process additionally is enhanced considerably by mechanical mixing of the mash, such mixing being on the one hand very easy because no additional devices are required in the tank and, on the other hand, very gentle because the sieve which fills the whole crosssectional area of the tank turns the mash gently without producing any cloudiness nor releasing any bitter flavour components from the pips.

Although it has been known as such to obtain improved color extraction during treatment of red grape mash by stirring the red grape mash during fermentation, the present invention offers the advantage over the known method that no stirring is effected during practically the whole fermentation time and that the stirring period itself is very short, compared with the whole fermentation time. In addition, it is an advantage over the said known method that, as mentioned before, the mash is treated with extreme care due to the particular design of the sieve turning the mash.

According to a further improvement of the invention, the grape juice is extracted at a point above the sieve and pumped in again at a point below the pomace which rises to the bottom face of the sieve.

Although in this embodiment of the method according to the invention the grape juice is agitated mechanically for most of the fermentation time, the described continuous movement of the grape juice through the pomace and the sieve acts to further intensify the color extraction and this in particular because, contrary to the circulation processes known from the prior art which are oppositely directed, the method of the invention supports the natural movement of the grape juice from the bottom to the top.

Further, to accelerate the fermentation start, the mash may be heated and/or cooled during fermentation by means of heat exchangers provided in the sieve—a step which is known as such.

This measure provides the advantage that the mash temperature can be kept substantially constant during the whole fermentation process by heating initially the excessively cold mash to a fermentation starting temperature and dissipating thereafter via heat exchangers the fermentation heat generated automatically during the fermentation process.

The sieve used for the before-described method and/or device may be of flat design.

This measure offers the advantage that the pomace components of the mash which due to their lower weight tend to rise and to gather below the sieve will be distributed evenly over the sieve; this would not occur in the same manner if a conical or funnel-shaped sieve were used because in this case the pomace components would tend to slide upwards along the sides of the sieve to its uppermost point.

The tank may consist substantially of an upright circular cylindrical portion, and the sieve may be circular in shape.

This measure provides the advantage that the device can be used in usual tanks so that no new tank constructions are needed and in addition the device can also be retrofitted easily in existing tanks.

In a further improvement of the invention, a discharge pipe is arranged in the wall of the tank at a point above the sieve but below the liquid level and the discharge pipe is connected via a pipeline and a pump to an inlet opening into the tank at a point below the sieve.

These measures also offer the advantage, which has been described already before in connection with the method of the invention, that a closed circuit of the grape juice can be realized to ensure even more efficient extraction of the color components.

In this case, it is particularly advantageous if the filling pipe is used simultaneously as inlet because then no additional fittings will be required.

In a particularly preferred embodiment of the invention, the inlet takes the form of a radial pipeline in the sieve ending in an axial pipeline in a downwardly extending axial arm which in turn is provided at its lower end with a spray head with upwarly directed nozzles.

This measure offers the advantage that the grape juice pumped in below the pomace components is pumped immediately in the direction of the pomace so that unnecessary turbulences are avoided in the grape juice portion below the pomace.

The before-described features are additionally of advantage when the sieve is seated at the inside of the tank in vertically adjustable mountings. For in this case the way of pumping is independent of the vertical position occupied by the sieve at any time, because the spray had is displaced axially together with the sieve.

The vertical adjustability of the sieve offers the significant advantage to permit the device according to the invention to be adapted to different filling conditions of the tank. This is particularly important because as a rule high-quality wines are received in very small quantities only so that sometimes not even a single tank can be filled completely in cellarage operations; the tanks used for these purposes must, however, be suited for different wine qualities and are therefore designed normally to provide the greatest possible capacity in order to permit profitable operation.

Finally, a further improvement of the invention may be provided with a conventional heat exchanger for the purpose of adjusting the temperature of the mash prior to and during the fermentation process, as has been described before.

Preferably, the tank is made of steel or precious steel, althgugh for cost reasons it may also consist of a plastic material, in particular a fiber reinforced plastic material, provided this is possible in view of the stresses encountered. This option regarding the choice of material applies also to the individual components of the tank, i.e. the agitators, closures, sieves and the like.

Other advantages of the invention will be apparent from the following specification and the enclosed drawing.

Examples of embodiments of the invention are shown in the drawing and will be described hereafter. In the drawing FIG. 1 is a side view (partially broken away) of a first embodiment of a device according to the invention and also intended to illustrate one embodiment of the method of the invention;

Figure 1:
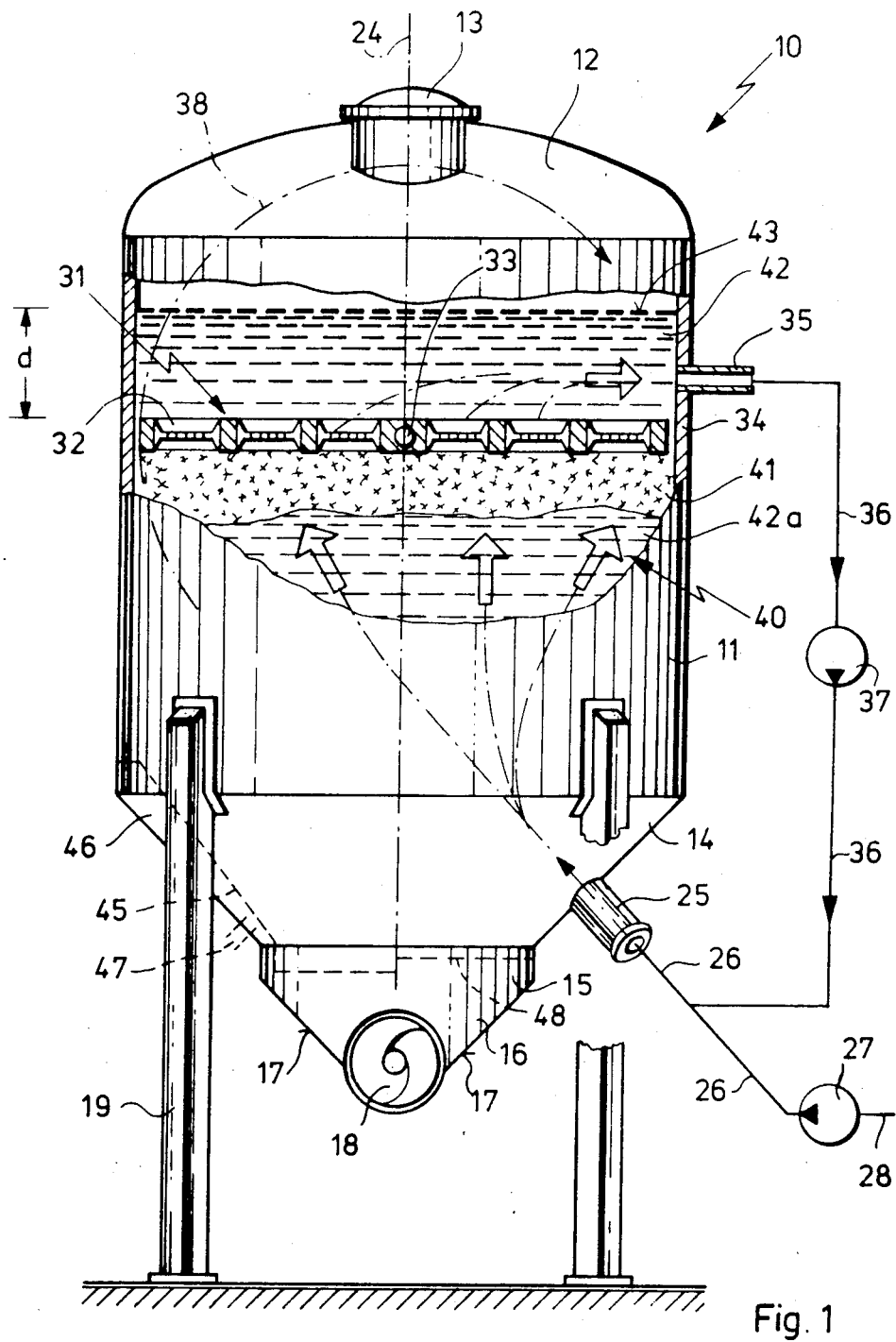

Referring now to FIG. 1, an upright tank having an outer structure as usually used for the treatment of red grape mash is indicated generally at 10. The tank 10 consists essentially of a cylindrical portion 11 closed at the top by a dome 12 provided with an opening 13 which may be designed as a manhole.

At the bottom, the cylindrical portion 11 is followed by a conical portion 14 ending again in a cylindrical portion 15. The cylindrical portion 15 ends at its bottom in a tapering portion 16 formed by two flat inclined surfaces 17 cutting the portion 15 laterally. A discharge worm 18 is provided between the inclined surfaces 17.

The tank 10 and the other tank components, such as agitators, sieves, closures, and the like, may be made from steel, precious steel or a plastic material, in particular a fiber-reinforced plastic material. The whole tank 10 is carried by several legs 19 supporting the tank 10 in the transition area between the cylindrical portion 11 and the conical portion 14.

The vertical axis of the tank 10 is indicated at 24.

In the area of the conical portion 14, a filling pipe 25 can be seen. The supply pipeline leading to this pipe is indicated schematically at 26. A pump 27 is connected to the pipeline 26 and capable of pumping mash from a pipeline 28, which may for example lead to a delivery vehicle, into the tank 10 from below, through the pipeline 26 and the filling pipe 25.

In the upper portion of the tank 10, a horizontally arranged flat sieve 31 can be seen which may for instance consist of a frame and several sieve inserts 32. The sieve 31 may be arranged to rotate about a horizontal shaft 33 extending perpendicularly to the drawing plane of FIG. 1, as indicated by the arrow 38.

A discharge pipe 35 may be provided above the sieve 31 in the wall 34 of the tank 10. A pipeline 36, which is indicated in the drawing schematically only, may lead from the said discharge pipe 35 to another pump 37 and from there as a branch line to the pipeline 26 which in turn leads to the filling pipe 25. It goes without saying that the pumps 27 and 37 may also be constituted by one and the same pump in which case the pipelines must be connected suitably via suitable valve arrangements.

The mash entering the tank 10 from below is indicated at 40. The mash 40 contains solid components, so-called pomace 41, which due to their low weight tend to rise upwards and to gather accordingly underneath the sieve 31 which spans the full interior cross-sectional are of the tank 10. According to the invention, more mash 40 is pumped into the tank 10 than would correspond to the volume below the sieve 31. Consequently, grape juice 42 rises through the sieve 31 until a level 43 at a height d above the sieve 31 is reached.

In one embodiment of the invention, the height d of the level 43 is for example 15 cm. It must, however, be ensured that sufficient fermentation room is left above the level 43 and below the dome 12 to provide the required space during fermentation of the mash 40.

As mentioned before, the mash 40 is pumped initially by the pump 27 into the bottom of the tank 10 until the grape juice reaches the level 43 above the sieve 31. Now, the mash may be left alone for a certain time as will be explained in detail further below in connection with FIG. 2. In one embodiment of the method of the invention, however, a closed circuit is established by means of the pipeline 36 and the pump 37 in that the grape juice is withdrawn above the sieve 31 and recirculated into the tank at a point further below via the filling pipe 25 or another separate pipe. Thus, the closed circuit indicated by the arrows in FIG. 1 is obtained. When regarding this circuit it will be apparent immediately that the grape juice 42 flowing through the pomace 41 can easily wash out the red color from the grape skins contained in the pomace 41.

If necessary, or when required for certain wine qualities which form a particularly solid pomace cake 41, the sieve 31 may at the end of the process of the invention be rotated about the axis 33, for example by means of a drive not shown in FIG. 1, so that a movement in the direction indicated at 38 in FIG. 1 is obtained. This last step of the process permits on the one hand to break up the pomace 41 which at that time has formed a solid pomace cake and, on the other hand, to extract the color still further from the fragments of the pomace cake by a final agitation step of the method of the invention. To achieve this purpose, it is absolutely sufficient to stir the mash 40 superficially by the sieve 31 because, as mentioned before, the solid components of the pomace 41 which contain the color have gathered anyway at the surface of the mash 40. Thus, it is also ensured that the mash 40 in the lower portion of the tank is not subjected to undue movement because this would only lead to cloudiness, i.e. a reduction in quality of the wine.

Upon completion of the washing-out process, either with or without final agitation of the mash, the grape juice 42 may then be drained at the bottom of the tank 10 in the conventional manner. This may be achieved for example by the device shown at the bottom of FIG. 1, left half, in which a funnel-shaped sieve 45 is arranged at a distance from the wall 34 in the area of the tank portions 11, 14, 15. In this manner, a juice chamber 46 is defined below the sieve 45 with a pipe 47 leading to the outside. The grape juice 42 may be drained trough the pipe 47, while the sieve 45 retains the pomace 41.

However, it is also possible to equip the cylindrical portion 15 with a flat circular sieve 48, as shown at the bottom of FIG. 1, right half, so that the juice chamber is formed by the tapering portion 16 and the grape juice 43 can be drained directly through the discharge worm 18.

Figure 2:
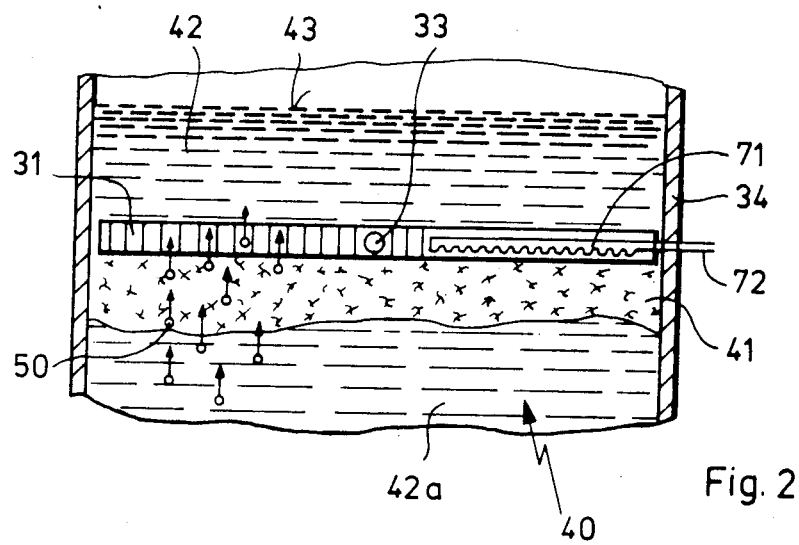
FIG. 2 shows a representation similar to part of the representation of FIG. 1, but illustrating other devices and methods according to the invention.

FIG. 2 shows an embodiment of the invention in which no mechanical action in the form of a closed grape juice circuit is exerted upon the mash 40.

When the pomace 41 collects in the described manner beneath the sieve 31, which in FIG. 2 is indicated only schematically, the mash 40 will start fermenting after a certain period of time. Bubbles 50 rising upwardly and passing the pomace 41 will form both in the pomace 41 and in the grape juice portion 42a below the pomace. The fermentation bubbles 50 and the liquid particles entrained by them wash the red pigments out of the grape skins contained in the pomace 41 and carry them upwardly into the pure grape juice 42 above the sieve 31.

In this manner, the red color is washed out by the fermentation process itself, without any mechanical action on the mash 40.

The right half of FIG. 2 shows a variant of the sieve 31 in which the latter is provided with a heat exchanger 71, a line 72 leading outwardly from the exchanger and connecting it to a suitable device which is not part of the subject-matter of the invention. With the aid of the heat exchanger 71, the newly filled-in mash which is relatively cold can be heated up to the so so-called fermentation starting temperature.

Once fermentation has started, the fermentation heat generated can be dissipated by introduction of a cooling agent into the line 72 to ensure that the mash will not be overheated.

Figure 3:
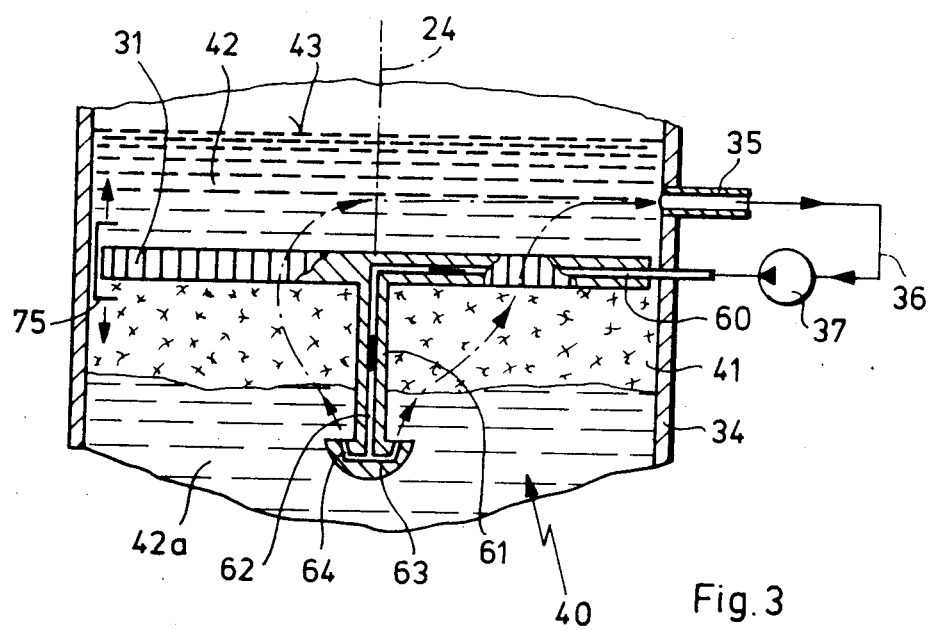
FIG. 3 shows a further representation similar to that shown in FIG. 2, but illustrating still further embodiments of methods and devices according to the invention.

FIG. 3 shows a further variant, again with a closed grape juice circuit. Contrary to the embodiment shown in FIG. 1, however, the grape juice is not recirculated into the tank below the sieve 31, but pumped into a radial pipeline 60 which is part of and arranged in a portion of the sieve 31, as shown in the cutaway portion of FIG. 3. In the area of the vertical axis 24, the sieve 31 is provided with a downwarly projecting axial arm 61 containing an axial pipeline 62 communicating with the radial pipeline 60. The arm 61 ends at the bottom in a spray head 63 provided with upwardly directed nozzles communicating with the axial pipeline 62.

As will be seen when regarding the arrows indicated in FIG. 3, this arrangement results again in a closed circuit of the grape juice 42. The latter is withdrawn by means of the pump 37 via the outlet pipe 35 at a point above the sieve 31, pumped into the radial line 60 via the line 36, guided to the nozzles 64 via the axial line 61 and then sprayed and/or washed by the latter against the pomace 41 from below. The grape juice 42 is thus caused to flow through the pomace 41 and the sieve 31 in a determined direction so that it returns into the area above the sieve 31 enriched with pigments.

Finally, a still further variant of the device of the invention is shown in FIG. 3 where a vertically adjustable mounting can be seen in the left portion of FIG. 3, by which the sieve 31 can be adjusted in the tank 10 along the vertical axis 24 so as to adapt itself to different filling conditions of the tank.

I claim:

1. Apparatus for treating liquid foodstuff containing solid particles, in particular for treating red grape mash, comprising:
   a tank adapted to be filled with said liquid foodstuff up to a level at a first predetermined vertical coordinate position, said tank having a predetermined horizontal cross-section area at a second predetermined vertical coordinate position located below said first vertical coordinate position;
   a sieve spanning an area corresponding to said horizontal cross-section area, said sieve being mounted in the tank for rotation about a substantially horizontal axis located at said second vertical coordinate positions;
   said sieve being permeable to said liquid foodstuff but impermeable to said solid particles;
   first tube means connected to said tank at a location between said first and said second vertical coordinate positions;
   second tube means connected to said tank below said second vertical coordinate position, said first and second tube means being in communication with one another; and
   pump means for establishing a flow of said liquid foodstuff through said first and second tube means and sieve.

2. Apparatus according to claim 1, including:
   a radial pipeline extending in said sieve and disposed to receive the liquid foodstuff from said second tube means;
   a downwardly extending arm on said sieve presenting an axial pipeline communicating with said radial pipeline to receive the liquid foodstuff therefrom; and
   a spray head on a lower end of said arm providing upwardly directed nozzles for receiving the liquid foodstuff from the axial pipeline and spraying same into the tank in a generally upward direction.

3. Apparatus according to claim 1, including heat exchange means on said sieve for heating the liquid foodstuff.

4. Apparatus according to claim 1, including vertically adjustable mountings for mounting said sieve to the tank.

* * * * *